Sept. 20, 1971           F. DONNELL           3,605,653
GAS-FIRED CHARCOAL LIGHTER AND METHOD OF CHARCOAL IGNITION
Filed Nov. 14, 1969
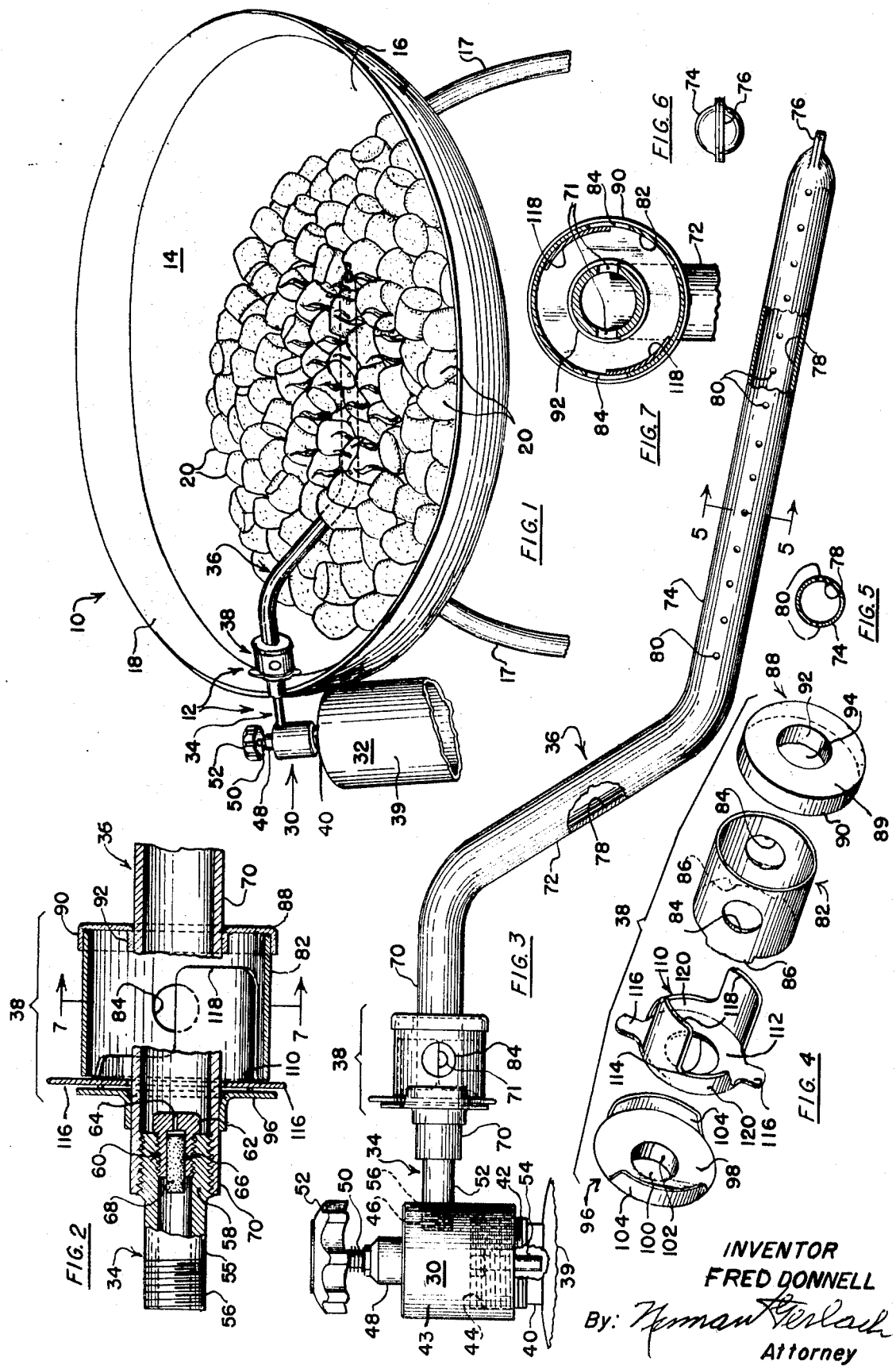
INVENTOR
FRED DONNELL
By: *Norman Gerlach*
          Attorney United States Patent Office 3,605,653
Patented Sept. 20, 1971

3,605,653
GAS-FIRED CHARCOAL LIGHTER AND METHOD OF CHARCOAL IGNITION
Fred Donnell, 332 Maplewood, Bridgman, Mich. 49106
Filed Nov. 14, 1969, Ser. No. 876,970
Int. Cl. F23b 1/02
U.S. Cl. 110—1F
7 Claims

ABSTRACT OF THE DISCLOSURE

A lighter for igniting any loosely piled combustible material and particularly adapted for lighting charcoal in any of the pans, bowls or hibachis of various shapes in common use for barbecuing. The lighter is adapted for connection to a portable propane or other high pressure fuel tank and incorporates a small diameter orifice feeding into a chamber designed to utilize the high velocity gas as a jet pump to provide a forced draft of air for rapid ignition of the combustible material, a movable member being provided to regulate the amount of air admitted to the jet pump and a conduit member being provided to conduct the gas and air to a burner member submerged in the loosely piled charcoal or other combustible material. In use, the lighter affords a novel method of ignition wherein the lighter functions as a forge to aerate the partially ignited pieces of charcoal.

The present invention relates to a novel or improved gas-fired charcoal lighter which is designed for use in connection with the ignition of loose charcoal pieces or fragments which may be briquettes or the like and are arranged in a pile within the combustion bowl of a barbeque stand. The invention is also concerned with a novel method of charcoal ignition which is made possible by means of the improved charcoal lighter.

The present invention contemplates the provision of a charcoal lighter which is fired by high pressure fuel gas, the presently preferred fuel being propane in a commercially available portable propane tank, the lighter embodying a proportioning valve for mixing air with the propane fuel and also embodying an elongated flame tube which is fed from the proportioning valve and which may, in a lighted condition, be buried or submerged in a completed or full pile of charcoal pieces such as charcoal briquettes. After burying or embedment of the ignited flame tube of the lighter, the pile of charcoal pieces and the jets or tongues of flame issuing from the tube may be regulated according to known requirements with the flame tube remaining in its embedded position until the desired degree of charcoal ignition has been effected. The flame tube is provided with plural rows of closely spaced flame jet producing holes, thus insuring a continuous ignition area through the pile of charcoal pieces from one side thereof to the other. Regulation of the gas-air mixture by the proportioning valve is resorted to in the interests of both efficiency and economy, an initial setting of this valve being effective to maintain ignition of the combustible mixture and prevent blowing out of the jets or tongues of flame prior to insertion of the flame tube in the pile, another setting of this valve being resorted to to produce a relatively lean fuel mixture during the first period of approximately one minute after embedment of the flame tube, during which period the faces of all charcoal pieces that are adjacent to the burner tube achieve ignition, and a still further or third valve setting being resorted to in order to produce a leaner or less rich fuel mixture where a preponderance of oxygen is released within the charcoal pile for forcible aeration of the pile in the manner of a blacksmith's forge and where the relatively small amount of propane gas which is mixed with the oxygen is completely consumed so that stoichiometric conditions are prevalent throughout the mass of charcoal and the latter is brought to an intense heat.

In the accompanying single sheet of drawings forming a part of this specification, one illustrative embodiment of the invention is shown by way of example rather than limitation.

In these drawings:
FIG. 1 is a perspective view of a barbecue stand, showing the improved gas-fired charcoal lighter operatively applied thereto and in actual charcoal-igniting operation;
FIG. 2 is an enlarged fragmentary sectional view taken substantially centrally and longitudinally through the proportioning valve assembly which is employed in connection with the illustrated lighter embodying the invention;
FIG. 3 is a side elevational view of the ligher;
FIG. 4 is an exploded perspective view of the principal component parts of the proportioning valve assembly of FIG. 2;
FIG. 5 is a transverse sectional view taken on the line 5—5 of FIG. 3;
FIG. 6 is an end view of the forward tip of a flame tube of the improved charcoal lighter; and
FIG. 7 is a transverse sectional view taken on the line 7—7 of FIG. 2.

Referring now to the drawings in detail and in particular to FIG. 1, a conventional outdoor barbecue stand which is designated in its entirety by the reference numeral 10 constitutes an exemplary environment for the disclosure of the present gas-fired charcoal lighter of the present invention, such lighter being designated by the reference numeral 12. The barbecue stand 10 embodies the usual upwardly opening shallow bowl 14 which is provided with a bottom wall 16 of curved dish-shape configuration and having an upstanding continuous marginal rim flange 18. Legs 17 serve to support the bowl over the ground or other supporting subjacent surface.

Briefly, the lighter 12 involves in its general organization a valve head 30 which is designed for attachment to a conventional propane tank 32, a nozzle assembly 34 which is threadedly received in the valve head 30, an elongated tubular flame tube 36, and a proportioning valve assembly 38 for the gaseous fuel constituents, namely, propane. The proportioning valve assembly 38 is mounted on the inner or proximate end of the flame tube 36.

The lighter 12 together with its attached propane tank 32 is so designed that it is capable of being suspended or "hung," so to speak, on the edge or rim of the continuous flange 18 of the bowl 10 (see FIG. 1) with a major forward portion of the flame tube 36 embedded in the pile of briquettes 20 in the bowl and with the nozzle assembly 34 overhanging the upper edge of said rim flange 18. In this position, the proportioning valve assembly 36 lies just inside the circumferential confines of the bowl 14 and hooks over the rim flange 18 in such a manner that the lighter as a whole cannot fall from its position of stable equilibrium.

As previously stated, the propane tank 32 is of conventional construction, it being obtainable on the market from many sources. The illustrated propane tank 32 consists of a hermetically sealed cylinder 39 which is formed of heavy gauge steel and, at its upper end, merges into a reduced neck 40 having an enlarged threaded section 42 which, in the present instances, is threadedly received in the valve head 30 in a manner that will be described presently.

The valve head 30 likewise is conventional, it being one of several designs of such heads which are non-disposable counterpart items for use with propane tanks, the particular design being dependent on the use to which the propane tank is to be put.

The details of the valve head 30 have not been fully disclosed herein, it being deemed sufficient to point out that this head includes a valve body 43 having a downwardly facing threaded socket 44 for threaded reception of the enlarged threaded section 42 of the neck 40 of the propane tank 32, the socket constituting an inlet opening for the propane gas which is contained under high pressure within the tank cylinder 39. A smaller threaded socket 46 in the side wall of the valve body 43 constitutes an outlet opening for the propane gas. An internally threaded, vertically extending, guide sleeve 48 forms a part of the valve body 43 and receives a vertically extending, externally threaded valve stem 50 therethrough, the stem carrying at its upper end a manual control knob 52. The valve structure within the valve casing 43 has not been disclosed herein, it being understood that such structure embodies the usual valve seat and movable valve element which, when seated, prevents passage of gas through the valve head, and when unseated, allows such passage of gas in an amount commensurate with the setting of the control knob 52 and its associated valve stem 50. A stab tube 54 depends centrally from the socket 44 and is adapted to be forcibly projected through an elastomeric seal (not shown) which is associated with the enlarged threaded section 42 of the reduced neck portion 40 of the tank cylinder 39 preparatory to actual threaded reception of the threaded section into the socket 44 in the lower portion of the body 43 of the valve head 30.

The above described valve is not essential to functioning of the lighter. A valve head having a main body, a downwardly facing threaded socket, a stab tube and a threaded socket in the side wall as described above, but without the vertically extending valve stem, valve seat and movable elements is adequate for functioning of the present lighter. Attachement of this last mentioned valve head to the tank and removal from the tank will accomplish the on-off function of the vertical valve stem and other valve elements.

The nozzle assembly 34 is comprised of an open-ended tube 55 having a proximate end which is provided with an external screw thread 56 and a distal end 58 which is provided with an external screw thread 60. The inner or proximate end of the tube 55 of the nozzle assembly 34 is threadedly received in the threaded socket 46 in the body 43 of the valve head 30 while the distal end of said tube threadedly receives therein a nozzle element 62 having a slightly enlarged head which has formed therein an axially extending nozzle orifice 64, the latter being of extremely small diameter. An inwardly or rearwardly facing socket 66 in the nozzle element 60 receives therein a filter element 68, the latter being disposed within the socket 66.

As best shown in FIG. 3, the flame tube 36 is of relatively great extent and it includes a proximate upper horizontal section 70 having a pair of diametrically opposite inlet openings 71 therein, a medial downwardly and outwardly inclined section 72, and a distal horizontal section 74. The open proximate end of the flame tube 36 is threadedly received over the external screw thread on the front or distal end 58 of the tube 55. The extreme forward end of the lower section 74 of the flame tube 36 is flattened as indicated at 76 to provide an end closure for the flame tube. The interior of the flame tube constitutes an elongated mixing chamber 78 for the propane gas and air which enters the tube through the inlet openings 71 under the control of the proportioning valve assembly 38 as will be described in detail subsequently. A longitudinal row of small, spaced apart holes 80 is provided on each side of the lower section 74 of the flame tube 36, these holes constituting flame-producing orifices and functioning in a manner that likewise will be described more fully subsequently.

The details of the proportioning valve assembly 38 are best shown in FIGS. 2 and 4. This assembly is mounted on and wholly supported by the upper section 70 of the flame tube 36 and includes four component parts which are separately illustrated in the exploded representation of FIG. 4. These four parts consist of a cylindrical tubular body portion 82, a front cap member 88, a rear cap member 96, and a shutter member 110. The body portion 82 of the proportioning valve assembly 36 is of open-ended tubular construction and has formed therein a pair of oppositely disposed air inlet openings 84. Two diametrically opposite spacer flanges 86 project rearwardly beyond the rear rim of the body portion 82. The front cap member 88 includes a flat disk-like annulus 89 having a rearwardly extending outer cylindrical rim flange 90 and an inner continuous cylindrical flange 92, the latter projecting rearwardly from a central opening 94 in the annulus 89. The rear cap member 96 includes a flat disk-like annulus 98 having a central opening 100 therein. From such opening, there extends rearwardly an inner cylindrical flange 102. Said rear cap member 96 also includes a pair of diametrically opposite forwardly extending arcuate rim flanges 104. The rotatable shutter member 110 consists of a flat disk-like annulus 112 having a central opening 114. From such opening there projects radially in opposite directions a pair of manipulating fingers 116. A pair of shutter plates 118 projects forwardly from the periphery or outer edge of the annulus 112 at diametrically disposed regions thereon, these shutter plates being designed for cooperation with the air inlet openings 84 in the tubular body portion 82 of the proportioning valve assembly 34 in a manner that will be set forth in detail when the operation of the charcoal lighter 12 is described.

The four above-described parts 82, 88, 96 and 110 are assembled together and supported on the proximate upper horizontal section 70 of the flame tube 36 in the manner shown in FIG. 2 wherein the two cap members 88 and 96 are press-fitted or otherwise secured in telescopic relation over said proximate upper horizontal section so that they are disposed on opposite sides of the inlet openings 71 in this section. The cylindrical tubular body portion 82 of the assembly 38 is fixedly secured between the two cap members 88 and 96 with the rim flanges 102 of the rear cap member 96 overlying and being disposed in radial register and contact with the rearwardly projecting flanges 86 on said body portion 82. The continuous rim flange 90 on the front cap member 88 encompasses the forward rim of the body portion 82. The shutter member 110 is, for the most part, disposed within the confines of the cylindrical tubular body portion 82 with the annulus 112 constituting a hub which is rotatably mounted on the flame tube 36 and lies close to the annulus 98, the two shutter plates 118 being selectively slidable in either circumferential direction against the inside cylindrical face of the body portion 82. The two manipulating fingers 116 project radially outwardly beyond the confines of the cylindrical tubular body portion 82 and extend between the voids or slots which are established between the circumferentially opposed side edges of the spacer flanges 86 on said body portion 82 and also the side edges of the overlying rim flanges 104 on the rear cap member 96. The outer ends of these fingers 116 are thus accessible for manipulation so that the shutter member 110 may be rotated in either direction to vary the effective size of the air inlet openings 84 by causing the shutter plates 118 to move across these openings.

In the operation of the above-described charcoal lighter 12, and in connection with the ignition of the briquettes 20 within the bowl 14 of the barbeque stand 10, the briquettes are initially arranged in the desired pattern within the bowl, the proportioning valve assembly 38 is regulated by manipulating the two radial fingers 116 so that the shutter plates 118 of the shutter member 110 slide to their closed position wherein they cover the air inlet openings 84 in the cylindrical tubular body portion 82 of the assembly. Thereafter, the knob 52 which is associated with the valve head 30 is actuated to move the valve structure within the valve cavity 43 to an open condition wherein the propane gas within the tank 32 is forced by internal gas pressure through the valve body and through the tube 55 of the nozzle assembly 34. With the shutter plates covering the air inlet openings 71, a gas rich mixture will be conducted to the flame tube and issue from the flame producing holes 80.

The gas rich mixture is conducive toward easy lighting and reduces the possibility of flame blow-out. After the lighting of the lighter, the forward tip of the flame tube is then thrust endwise and substantially horiontally into the mound of briquettes 20 in the bowl 14 until the lower or distal horizontal section 74 of the flame tube is substantially completely embedded in the mound. It is to be noted at this point that due to the angular shape of the flame tube, horizontal projection of the tube into the mound of briquettes is faciliated.

After embedment of the distal horizontal section 74 of the flame tube 36 in the manner set forth above, the nozzle assembly 34 may be brought to rest in an overhanging condition on the rim flange 18 of the bowl 14 and with the propane tank 32 assuming a substantially vertical position along side the bowl 14 of the barbeque stand 10. As soon as the lighter 12 has been thus positioned, the radial fingers 116 are again manipulated in such a manner as to cause the shutter plates 118 partially to uncover the air inlet openings 84, thus allowing an increased amount of air to enter the mixing chamber, thereby providing a mixture with a degree of excess air for full combustion to issue from the flame tube 36. This mixture is conducive to a hot flame and rapid ignition of the charcoal in the immediate vicinity of the flame tube.

After a given period of time which is on the order of one minute, the radial shutter-actuating fingers 116 are again manipulated, this time in such a manner as to open the shutter plates to their fullest extent and fully uncover the air inlet openings 84 so that a great preponderance of air is mixed with the propane gas within the mixing chamber 78. This results in the emission of an excessively lean fuel mixture from the flame-producing holes 80, the preponderance of oxygen-containing air functioning in the manner of a blacksmith's forge thoroughly to aerate the mass of charcoal and bring the same up to intense internal heat. The air gas ratio at this time is not a combustible mixture. The excess oxygen is consumed in the rapid spread of charcoal ignition in the vicinity of the flame tube 36 which was achieved during the previous setting of the shutter 118. The fuel will now be observed to burn in the more remote areas of the charcoal mass.

The invention is not to be limited to the exact arrangement of parts shown in the accompanying drawings or described in this specification as various changes in the details of construction may be resorted to without departing from the spirit or scope of the invention.

Having thus described the invention what I claim as new and desired to secure by Letters Patent is:

1. A portable gas-fired charcoal lighter comprising:
a valve head adapted to be mounted on a gas tank containing pressurized fuel gas and provided with a gas outlet port and a manually-manipulatable shut-off valve for controlling the flow of gas through said outlet port,
an elongated rigid flame tube presenting a proximate section, an imperforate medial section arranged at an angle to said proximate section, and a distal section with a multiplicity of relatively small flame-producing holes therein and arranged at an angle to said medial section opposite to the angle of said proximate section,
means establishing a rigid connection between the proximate section of the flame tube and said valve head and communicating with said outlet port of the valve head,
there being an air inlet opening in said proximate section of the flame tube,
and manually operable valve means carried on said proximate section and controlling the effective size of said opening.

2. A portable gas-fired charcoal lighter according to claim 1 and wherein the proximate and distal sections of the flame tube are linearly straight, are offset from each other and extend in parallelism, the medial section is inclined forwardly and downwardly, and the proportioning valve assembly is positioned a slight distance forwardly of the valve head, whereby the charcoal lighter as a whole may be supported bodily in a stable position on the rim of a barbeque bowl with the proximate section embedded in a mound or charcoal within the bowl, with the extreme proximate end of the flame tube resting on said rim, and the gas tank lying outside the bowl.

3. The method of igniting a mound of loose charcoal to bring the same to a predetermined advanced state of ignition, said method comprising:
positioning a hollow perforate burner tube within said mound so as substantially to cover the perforations thereof,
supplying a combustible mixture of fuel gas and air to said burner tube with the mixture issuing from the perforations ignited,
maintaining the burner tube with the combustible mixture thus ignited for a period of time adequate to bring the adjacent surrounding charcoal to a self-sustaining condition of ignition,
thereafter greatly increasing the oxygen content of the mixture supplied to the burner by increasing the supply of air subject to jet induction resulting from the flow of fuel gas flowing in said burner tube so as to aerate the mound of charcoal while the latter is in such self-sustaining ignited condition until such predetermined advanced state of ignition is attained,
and finally withdrawing the burner tube from the mound.

4. A portable gas-fired lighter comprising means forming a conduit presenting a proximate section, an imperforate medial section, and a distal section with a multiplicity of small flame producing holes therein,
said conduit from said proximate section to the distal end of said distal section being a continuous self supporting tube closed at its distal end and having a substantially unobstructed exterior cross section,
means for establishing a connection between the proximate section of the conduit and a gas bottle,
said connection including a small diameter orifice at the proximate end of the conduit opening to said bottle,
there being an air inlet opening in said proximate section of the conduit spaced from said connection and in air inducting relation to gas flowing in said conduit,
and manually operable valve means for controlling the effective size of said air inlet opening.

5. A lighter as defined in claim 4 in which there is a manually-operable on-off gas valve incorporated in the connection means between the gas bottle and the orifice.

6. A lighter as defined in claim 4 in which said tube is angled oppositely from each end of its medial section at acute angles.

7. A lighter as defined in claim 4 in which said orifice, said air inlet opening and manually operative valve means are proportioned to be capable of introducing substantially more air than is needed for complete combustion of the gas discharge from the bottle.

References Cited

UNITED STATES PATENTS

| | | | |
|---|---|---|---|
| 1,180,107 | 4/1916 | Cardin | 110—1X |
| 2,737,233 | 3/1956 | Mueller | 126—25 |
| 3,033,275 | 5/1962 | Nichous | 126—25 |
| 3,339,508 | 9/1967 | Bean | 110—1 |
| 3,347,220 | 10/1967 | Barbera | 126—25 |
| 3,410,261 | 11/1968 | Cooper et al. | 126—25 |

EDWARD G. FAVORS, Primary Examiner

U.S. Cl. X.R.

126—25B